United States Patent [19]

Olvera

[11] 4,221,189
[45] Sep. 9, 1980

[54] PROTECTIVE CUPS FOR NEWLY CROPPED EARS OF DOGS

[76] Inventor: Theadora A. Olvera, 364 Henson St., San Diego, Calif. 92114

[21] Appl. No.: 34,750

[22] Filed: Apr. 30, 1979

[51] Int. Cl.³ ............................................. A01K 29/00
[52] U.S. Cl. ..................................... 119/96; 119/143; 128/133
[58] Field of Search ......................... 119/96, 143, 144; 128/132 R, 133, 346

[56] References Cited

U.S. PATENT DOCUMENTS

| | | | |
|---|---|---|---|
| 2,225,896 | 12/1940 | Belknap | 128/133 |
| 3,257,990 | 6/1966 | Robertson et al. | 119/96 |
| 4,059,106 | 11/1977 | Shannon | 119/143 |

FOREIGN PATENT DOCUMENTS 989 of 1910 United Kingdom .................... 119/143

*Primary Examiner*—Jay N. Eskovitz
*Attorney, Agent, or Firm*—Henri J. A. Charmasson

[57] ABSTRACT

A pair of oblong cups designed to protect newly cropped ears of dogs. Each of the cups has its upper end attached to the arch of a vet's rack. The opposite ends of both cups are connected by means of a strap tied under the dog's neck. The cups are made of non-toxic plastic material and are perforated with ventilation holes over their entire surface.

6 Claims, 6 Drawing Figures

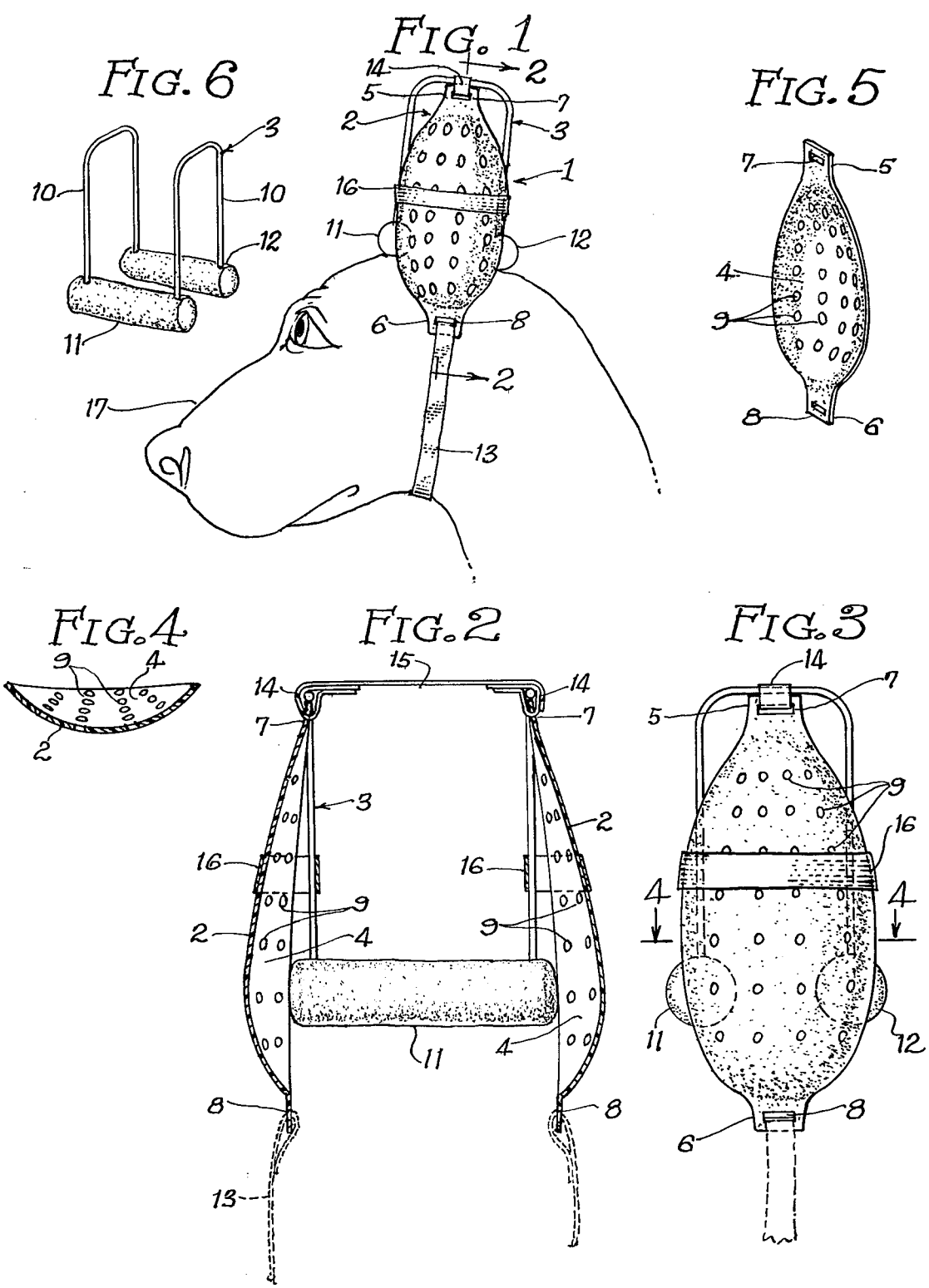

PROTECTIVE CUPS FOR NEWLY CROPPED EARS OF DOGS

BACKGROUND OF THE INVENTION

This invention relates generally to post-operative, protective devices for animals; and more particularly for the protection of newly cropped ears of dogs. It is common practice to crop the ears of certain dogs such as great danes, boxers and doberman pinschers so that they will stand erect. Cropping is usually done when the dog is very young so that his ears may be properly trained. After cropping the ears are usually taped to so-called "vets racks". One of such devices is disclosed in U.S. Pat. No. 3,257,990, F. Robertson, et al. After cropping and unless they are restrained, dogs have a tendency to scratch the healing ears, loosening the taping and sometimes ripping out the stitches. In the past, the problem has been alleviated by either fettering the legs of the dog or by fitting him with a large cardboard collar during the healing period. Most young dogs do not like to be fettered and will complain very noisely of such treatment. On the other hand oversized cardboard collars are cumbersome and interfere with most of the puppy's activities.

SUMMARY OF THE INVENTION

It is the principal object of this invention to provide an improved apparatus for protecting newly cropped ears of dogs.

Another object of the invention is to provide such a protective device which allows full view of the cropped ears for proper after care and periodical inspection.

A further object of the invention is to provide such a protective device which allows air circulation for fast healing.

Yet another object of this invention is to provide such a protective device which will be immune to repeated scratching and thus will not require that the legs of a dog be fettered during the healing period.

An additional object of this invention is to provide such a protective device which will be easy to install, easy to clean, light in weight and very durable.

These and other objects of the invention are achieved by a pair of oblong plastic cups made of non-toxic plastic and which are designed to be hung from a vet's rack and jointed together by a strap tied under the dog's neck.

DESCRIPTION OF THE DRAWINGS

FIG. 1 is a side view of a dog's head fitted with the protective cups;

FIG. 2 is a cross sectional view of the protective device taken along line 2—2 of FIG. 1;

FIG. 3 is a side elevational view of the protective device;

FIG. 4 is a cross sectional view of the cup taken along line 4—4 of FIG. 3;

FIG. 5 is a perspective view of a cup; and

FIG. 6 is a perspective view of the supporting rack.

DESCRIPTION OF THE PREFERRED EMBODIMENT OF THE INVENTION

Referring now to the drawing and in accordance with the invention, there is illustrated a post-operative device 1 for protecting the newly cropped ears of a dog. Essentially, the device consists of a pair of protective cups 2 suspended from a rack 3 and kept in place by a strap 13 passing under the chin of the dog 17. The rack 3 comprises two arches 10, each bridging over one of the dog's ears. The forward bases of the two arches 10 are joined by a transversal member 11 and the backward bases of the arches 10 are joined by a similar member 12. The transversal members 11 and 12 are shaped like rollers and are padded with resilient cushioning material. The rollers are designed to be mounted on the skull of the dog 17. One of the rollers 11 being placed at the frontal base of the ear and the other roller 12 being placed just behind the ears. The cups 2 are suspended from the top of the arches 10 and secured by a piece of tape 14 engaged into a slot 7 cut into the upper end 5 of the cups. They are secured at the other end by a strap 13 passing through a second slot 8 cut into the lower appendage 6 of the cups 2. The cups 2 form a hemi-ovoidal shield whose concavity surrounds the outline of the dog's ear. The cup is made of rigid plastic material and its surface is perforated with small ventilation holes to facilitate healing. The strap 13 may be made out of a piece of gauze or from a nylon stocking or any other soft material which will not injure the dog's neck. The cups 2 may be bound to the arches 10 by an additional piece of tape 16 wrapped around the mid sections of the cups. For added stability, the tops of the arches 10 may be braced by an additional piece of tape 15.

While I have described the preferred embodiment of my invention, and suggested modifications thereto, other embodiments may be devised and other modifications may be made without departing from the spirit and scope of the appended claims.

The invention claimed is:

1. A device for protecting newly cropped ears of a dog which comprises:
    a first rigid arcuate frame bridging over one of the newly cropped ears;
    means for stationarily holding said frame on the head of the dog;
    a first hemi-ovoidal shield made of rigid material, said shield being shaped and dimensioned to cover the cropping scar when it is attached to said frame;
    means for fixedly attaching said shield to said frame; and
    means for anchoring said frame and shield on the dog's head.

2. The device claimed in claim 1 which further comprises:
    a second rigid arcuate frame bridging over the other ear;
    a second hemi-ovoidal shield made of rigid material;
    means for fixedly attaching said second shield to said second frame and wherein,
    said means for stationarily holding comprise:
    at least one elongated member transversly mounted over the head of the dog, joining the first arcuate frame to the second arcuate frame; and
    said means for anchoring comprise a strap passing under the dog's chin tying the lower end of the first shield to the lower end of the second shield.

3. The device claimed in claim 2 which further comprises:
    an elongated member transversely mounted over the head of the dog and joining the first arch to the second arch.

4. The device claimed in claim 2 which further compises a first elongated member joining the forward base of the first arch to the forward base of the second arch;

a second elongated member joining the backward base of the first arch to the backward base of the second arch; and
cushioning material surrounding said first and second elongated members.

5. The device claimed in claim 1 wherein said shield has ventilation holes.

6. The device claimed in claim 5 wherein said shield is made of a non-toxic plastic material.